No. 833,492. PATENTED OCT. 16, 1906.
L. VAN HORN.
GAS FIXTURE AND MIRROR SUPPORT.
APPLICATION FILED FEB. 19, 1906.
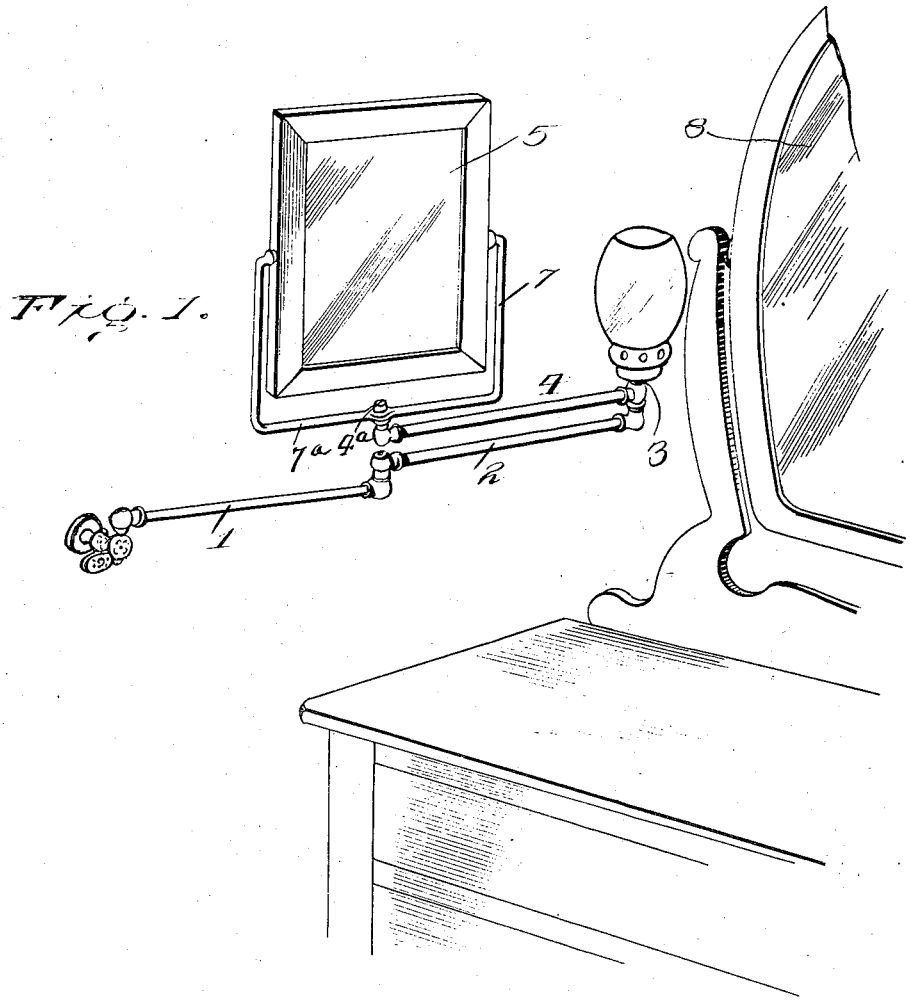
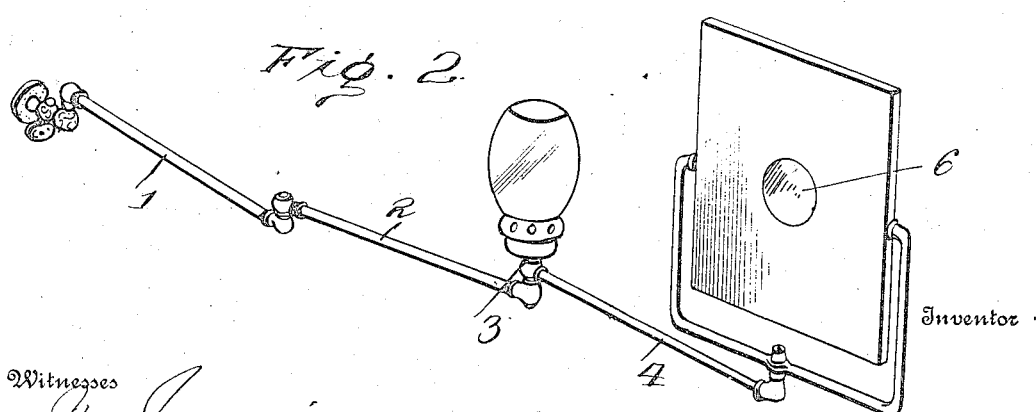

UNITED STATES PATENT OFFICE.

LAUNY VAN HORN, OF LETTS, IOWA.

GAS-FIXTURE AND MIRROR-SUPPORT.

No. 833,492.　　　Specification of Letters Patent.　　Patented Oct. 16, 1906.

Application filed February 19, 1906. Serial No. 301,916.

*To all whom it may concern:*

Be it known that I, LAUNY VAN HORN, a citizen of the United States, residing at Letts, in the county of Louisa and State of Iowa, have invented certain new and useful Improvements in Gas-Fixtures and Mirror-Supports, of which the following is a specification.

This invention provides a novel support for a mirror and reflector and aims to utilize a wall gas fixture or bracket for this purpose.

The invention has for its object to utilize a gas-bracket by combining therewith an arm arranged to swing about the burner or jet orifice, said arm carrying a mirror and reflector, which in conjunction with a second mirror will enable a person to observe the back of the head or body or enable the light to be thrown to any point, as may be required.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a perspective view of the invention, showing the flat side of the mirror. Fig. 2 is a perspective view illustrating the reflector side of the mirror attachment.

The invention may be applied to any type of gas fixture or bracket mounted to swing, whether the same comprises one or more articulating sections or arms. As shown, the invention is illustrated in connection with a gas-bracket comprising a series of arms or sections jointed in the usual way, so as to swing in a horizontal plane.

The burner 3 is at the outer end of the arm or section 2, which latter swings on the wall-section 1. The gas passes to the burner 3 through the sections or arms 1 and 2 in the accustomed manner. The arm or section 4, while jointed to the section 2 in substantially the same manner as the sections 1 and 2, are jointed, so as to present the appearance of a three-arm bracket, is not a gas-conducting arm, but serves simply as a support for the mirror 5. The mirror-supporting arm 4 is thus adapted to turn or swing about the burner or jet orifice 3 and is supplied at its outer or free end with a mirror 5 of any design, pattern, or make and mounted so as to be turned to any angle with reference to a horizontal axis. A reflector 6 is provided upon the rear side of the mirror 5 for concentration of the rays of light when it is required to direct the same upon any object or to throw them to any point. The mirror and reflector may be formed together or consist of separate parts combined in any way. A frame 7 pivotally supports the mirror 5 to admit of the latter being turned to any required angular adjustment with reference to the perpendicular. The frame 7 is connected to the outer end of the mirror-supporting arm 4 in a way to admit of its turning freely about a vertical axis, so that the light may be directed to any point or the person enabled to conveniently adjust the mirror with reference to a second or supplemental mirror, as 8, which may be mounted upon an article of furniture or arranged upon the wall in any manner.

It is to be observed that the gas fixture or bracket as a whole is adapted to swing horizontally, the various arms to be turned to any angle with relation to each other. With this construction the mirror-supporting arm 4 may be swung about the burner or jet orifice to direct the light-rays to any point or to admit of the person conveniently observing his or her back in connection with the mirror 8, as will be readily understood. In addition to the swinging of the arm 4 the frame 7 is likewise adapted to be turned about a vertical axis and the mirror 5 itself to be turned about a horizontal axis to any angle with reference to the vertical.

Preferably in the specific construction of the invention it is designed that the arm 4 be provided at its outer extremity with a vertical pin or pivot $4^a$, which passes through the horizontal or cross bar $7^a$ at the lower portion of the frame 7. Said frame 7 embodies the bar $7^a$ and the sides or vertical portion projecting upwardly from the opposite sides of said bar. The upper extremities of the sides of the frame 7 project inwardly to connect with the mirror 5. The pin $4^a$ passes through the bar $7^a$ at a point about at the center of said bar. An essential feature of the invention, however, resides in the location of the gas-jet at one of the intermediate joints of the bracket and the provision of the outer arm with a combined mirror and reflector of the type described, which enables the light to be employed to the best advantage.

Having thus described the invention, what is claimed as new is—

In a device of the character described, the combination of a gas fixture or bracket comprising a plurality of arms pivotally connected to each other and adapted to swing in a horizontal plane, a gas-jet located at one of the intermediate joints between the arms, a pin or pivot projecting upwardly from the extremity of the outer arm, a mirror-supporting frame comprising sides and a cross-bar connecting said sides, the said cross-bar being provided with an opening through which the before-mentioned pin or pivot is passed, and a mirror pivotally mounted between the before-mentioned sides of the frame and adapted to swing upon a horizontal axis, the mirror-supporting frame itself being mounted so as to swing upon a vertical axis.

In testimony whereof I affix my signature in presence of two witnesses.

LAUNY VAN HORN. [L. S.]

Witnesses:
J. A. McDANIEL,
E. H. BARNES.